United States Patent
Hadjieleftheriou et al.

(10) Patent No.: US 10,803,099 B2
(45) Date of Patent: Oct. 13, 2020

(54) INCREMENTAL MAINTENANCE OF INVERTED INDEXES FOR APPROXIMATE STRING MATCHING

(71) Applicant: AT&T Intellectual Property I, L.P., Atlanta, GA (US)

(72) Inventors: Marios Hadjieleftheriou, Morristown, NJ (US); Nick Koudas, Toronto (CA); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 42 days.

(21) Appl. No.: 16/135,113

(22) Filed: Sep. 19, 2018

(65) Prior Publication Data
US 2019/0018891 A1    Jan. 17, 2019

Related U.S. Application Data (63) Continuation of application No. 15/339,142, filed on Oct. 31, 2016, now Pat. No. 10,120,931, which is a continuation of application No. 13/595,270, filed on Aug. 27, 2012, now Pat. No. 9,514,172, which is a continuation of application No. 12/481,693, filed on Jun. 10, 2009, now Pat. No. 8,271,499.

(51) Int. Cl.
*G06F 16/31*    (2019.01)
*G06F 16/22*    (2019.01)

(52) U.S. Cl.
CPC ........ *G06F 16/328* (2019.01); *G06F 16/2272* (2019.01); *G06F 16/319* (2019.01)

(58) Field of Classification Search
None
See application file for complete search history.

(56) References Cited

U.S. PATENT DOCUMENTS

| | | |
|---|---|---|
| 7,266,554 B2 | 9/2007 | Kayahara et al. |
| 7,546,316 B2 | 6/2009 | Dunning et al. |
| 7,702,666 B2 | 4/2010 | Oseto |
| 7,711,668 B2 | 5/2010 | Brinker et al. |
| 7,720,852 B2 | 5/2010 | Dunning |
| 7,769,772 B2 | 8/2010 | Weyl et al. |
| 7,792,840 B2 | 9/2010 | Whang et al. |
| 7,840,565 B2 | 11/2010 | Kutsumi et al. |
| 7,912,843 B2 | 3/2011 | Murdock et al. |
| 7,979,459 B2 | 7/2011 | Wu et al. |

(Continued)

OTHER PUBLICATIONS

M. Hadjieleftheriou et al., "Fast Indexes and Algorithms for Set Similarity Selection Queries," IEEE (Institute of Electrical and Electronics Engineers) International Conference of Data Engineering (ICDE), Apr. 2008, 10 pages.

(Continued)

*Primary Examiner* — Christopher J Raab (57) ABSTRACT

In embodiments of the disclosed technology, indexes, such as inverted indexes, are updated only as necessary to guarantee answer precision within predefined thresholds which are determined with little cost in comparison to the updates of the indexes themselves. With the present technology, a batch of daily updates can be processed in a matter of minutes, rather than a few hours for rebuilding an index, and a query may be answered with assurances that the results are accurate or within a threshold of accuracy.

20 Claims, 4 Drawing Sheets

(56) References Cited

U.S. PATENT DOCUMENTS

| | | |
|---|---|---|
| 8,145,636 B1 | 3/2012 | Jeh et al. |
| 8,510,312 B1 | 8/2013 | Thibaux et al. |
| 2004/0243816 A1 | 12/2004 | Hacigumus et al. |
| 2004/0255218 A1* | 12/2004 | Tada ................. G06K 9/72 714/747 |
| 2009/0063404 A1* | 3/2009 | Hacigumus .......... G06F 16/316 |
| 2009/0171955 A1* | 7/2009 | Merz ............. G06F 16/24558 |
| 2009/0204609 A1* | 8/2009 | Labrou ............ G06F 16/3322 |
| 2010/0125594 A1* | 5/2010 | Li ................. G06F 16/90344 707/758 |
| 2010/0191746 A1 | 7/2010 | Wang et al. |
| 2010/0205184 A1 | 8/2010 | Marciniak et al. |
| 2012/0131021 A1 | 5/2012 | Blair-Goldensohn et al. |

OTHER PUBLICATIONS

N. Koudas et al., Propagating Updates in SPIDER', International Conference of Data Engineering 2007, pp. 1146-1153.

* cited by examiner

INCREMENTAL MAINTENANCE OF INVERTED INDEXES FOR APPROXIMATE STRING MATCHING

CROSS-REFERENCE TO RELATED APPLICATIONS

This application is a continuation of U.S. patent application Ser. No. 15/339,142, filed Oct. 31, 2016, which is a continuation of U.S. patent application Ser. No. 13/595,270, filed Aug. 27, 2012, now U.S. Pat. No. 9,514,172, which is a continuation of U.S. patent application Ser. No. 12/481,693, filed Jun. 10, 2009, now U.S. Pat. No. 8,271,499, the disclosures of which are incorporated herein by reference in their entirety.

BACKGROUND

Approximate string matching is a problem that has received a lot of attention recently. Existing work on information retrieval has concentrated on a variety of similarity measures specifically tailored for document retrieval purposes. Such similarity measures include TF/IDF (term frequency/inverse document frequency), a statistical measure used in information retrieval and text mining for evaluating how important a word is to a document in a collection or corpus; BM25 (also known as "Okapi BM25"), a ranking function used by search engines to rank matching documents according to their relevance to a given search query developed in the 1970s and 1980s by Stephen E. Robertson, Karen Sparck Jones, and others; and HMM (hidden Markov model) which is a statistical model in which the system being modeled is assumed to be a Markov process with unknown parameters, and hidden parameters are determined from the observable parameters.

As new implementations of retrieving short strings are becoming popular (e.g., local search engines like YellowPages.com, Yahoo!Local, and Google Maps), new indexing methods are needed, tailored for short strings. For that purpose, a number of indexing techniques and related algorithms have been proposed based on length normalized similarity measures. A common denominator of indexes for length normalized measures is that maintaining the underlying structures in the presence of incremental updates is inefficient, mainly due to data dependent, precomputed weights associated with each distinct token or string. Incorporating updates, in the prior art, is usually accomplished by rebuilding the indexes at regular time intervals.

The prior art is mainly concerned with document retrieval speeds, however, given that queries often contain spelling mistakes and other errors, and stored data have inconsistencies as well, effectively dealing with short strings requires the use of specialized approximate string matching indexes and algorithms. Although fundamentally documents are long strings, the prior art, in general, makes assumptions which are not true when dealing with shorter strings. For example, the frequency of a term in a document might suggest that the document is related to a particular query or topic with high probability, while the frequency of a given token or word in a string does not imply that a longer string (containing more tokens) is more similar to the query than a shorter string. Or the fact that shorter documents are preferred over longer documents (the scores of short documents are boosted according to the parsimony rule from information theory) conflicts with the fact that in practice for short queries the vast majority of the time users expect almost exact answers (answers of length similar to the length of the query). This is compounded by the fact that for short strings length does not vary as much as for documents in the first place, making some length normalization strategies ineffective. Moreover, certain other properties of short strings enable us to design very fast specialized approximate string matching indexes in practice.

In many applications it is not uncommon to have to execute multiple types of searches in parallel in order to retrieve the best candidate results to a particular query, and use a final ranking step to combine the results. For example, types of searches include: almost exact search versus substring search, ignore special characters search, full string search or per word search, n-gram (where 'n' is the length of component strings in which the data is broken into for indexing and may be, for example, 2-grams, 3-grams, 4-grams etc.), and edit distance versus TF/IDF search.

Recently, M. Hadjieleftheriou, A. Chandel, N. Koudas, and D. Srivastava in IEEE (Institute of Electrical and Electornics Engineers) International Conference of Data Engineering (ICDE), "Fast indexes and algorithms for set similarity selection queries", designed specialized index structures using $L_2$ length normalization that enable retrieval of almost exact matches with little computational cost by using very aggressive pruning strategies. Nevertheless, the drawback of this approach is that the indexes are computationally expensive to construct and they do not support incremental updates. Generally speaking, even though various types of length normalization strategies have been proposed in the past, approaches that have strict properties that can enable aggressive index pruning are hard to maintain incrementally, while simpler normalization methods are easier to maintain but suffer in terms of query efficiency and result quality, yielding slower answers and significantly larger (i.e., fuzzier) candidate sets.

A key issue to deal with in a real system is that data is continuously updated. A small number of updates to the dataset would necessitate near complete recomputation of a normalized index, since such indexes are sensitive to the total number of records in the dataset, and the distribution of terms (n-grams, words, etc.) within the strings. Given that datasets tend to contain tens of millions of strings and that strings could be updated on an hourly basis, recomputation of the indexes can be prohibitively expensive. In most practical cases, updates are buffered and the indexes are rebuild on a weekly basis. Index recomputation typically takes up to a few hours to complete. However, the online nature of some applications necessitates reflecting updates to the data as soon as possible. Hence, being able to support incremental updates as well as very efficient query evaluation are critical requirements.

In N. Koudas, A. Marathe, and D. Srivastava, "Propagating updates in SPIDER" (which may be found on pages 1146-1153, 2007 ICDE), two techniques were proposed for enabling propagation of updates to the inverted indexes. The first was blocking the updates and processing them in batch. The second was thresholding updates and performing propagation in multiple stages down the index, depending on the update cost one is willing to tolerate. That work presented heuristics that perform well in practice, based on various observations about the distribution of tokens in real data, but it did not provide any theoretical guarantees with respect to answer accuracy while updates have not been propagated fully.

Thus, there remains a key problem of inefficiency, regarding length normalized index structures for approximate string matching, in large part, due to data dependent, normalized weights associated with each distinct token or string in the database.

SUMMARY

Embodiments of the disclosed technology comprise a method and device for limiting updates of indexes, such as inverted indexes, in a database. It is an object of the invention to allow for efficient, partial updating of indexes that immediately reflects the new data in the indexes in a way that gives strict guarantees on the quality of subsequent query answers. More specifically, a technique of the disclosed technology guarantees against false negatives and limits the number of false positives produced in a query, while the indexes have not been updated fully.

In the disclosed technology, indexes, such as inverted indexes, are updated only as necessary to guarantee answer precision within predefined thresholds which are determined with little cost in comparison to the updates of the indexes themselves. With the present technology, a batch of daily updates can be completed (or applied) in a matter of minutes, rather than a few hours for rebuilding an index, and a query may be answered with assurances that the results are accurate or within a threshold of accuracy.

The inverse document frequency (IDF) for each n-gram in a plurality of strings is determined (as shown below), a length of each string in the plurality of strings is determined (as shown below). An inverted list for each n-gram is created, being composed of all instances of strings from a plurality of strings, that contain the particular n-gram. Each inverted list is sorted by the length of the strings in the list. Then, an update of at least one string in the plurality of strings is received, such as an addition, modification or deletion to the data by a user or as a result of user input. The IDF of each n-gram is recalculated, and as a result the length of each string changes, but the inverted lists are updated only when a predefined error threshold has been reached (error being the direct result of using stale inverted lists that contain string lengths that have been computed using stale n-gram IDFs). A data query, such as a request to receive information from the database, is answered based on the partially updated inverted lists.

The error threshold in n-gram IDFs, and consequently, in string lengths is such that the similarity score computed using the outdated IDFs between any pair of strings, cannot diverge by more than a predetermined factor from the exact similarity score, computed using the exact n-gram IDFs.

DETAILED DESCRIPTION

Indexes for approximate string matching are mostly based on token decomposition of strings (e.g., into n-grams or words) and building inverted lists over these tokens. Then, similarity of strings is measured in terms of similarity of the respective token sets (e.g., by using the vector space model to compute cosine similarity). Consider strings "Walmart" and "Wal-mart". We can decompose the two strings in 3-gram sets {'Wal', 'alm', 'lma', 'mar', 'art'} and {'Wal', 'al-', 'l-m', '-ma', 'mar', 'are'}. The two sets have three 3-grams in common. Using the two sets we can compute the TF/IDF based cosine similarity score between the two strings. In relational database tables data can be considered as short strings—categorical, numerical, varchar, and other data types that, in practice, are first converted into strings for similarity evaluation purposes.

The larger the intersection of two multi-sets, the larger the potential similarity. Nevertheless, not all tokens are created equal. Tokens that appear very frequently in the database (like 'art') carry small information content, whereas rare tokens (like 'l-m') are more important semantically. Hence, the more important a token is, the larger the role it should play in overall similarity. For that reason, weighted similarity measures use the Inverse Document Frequency (herein, "IDF") to determine the weight of a token or string. The IDF of a token or string is the inverse of the total number of times that this token or string appears in a data collection, such as a database.

Figure 1:
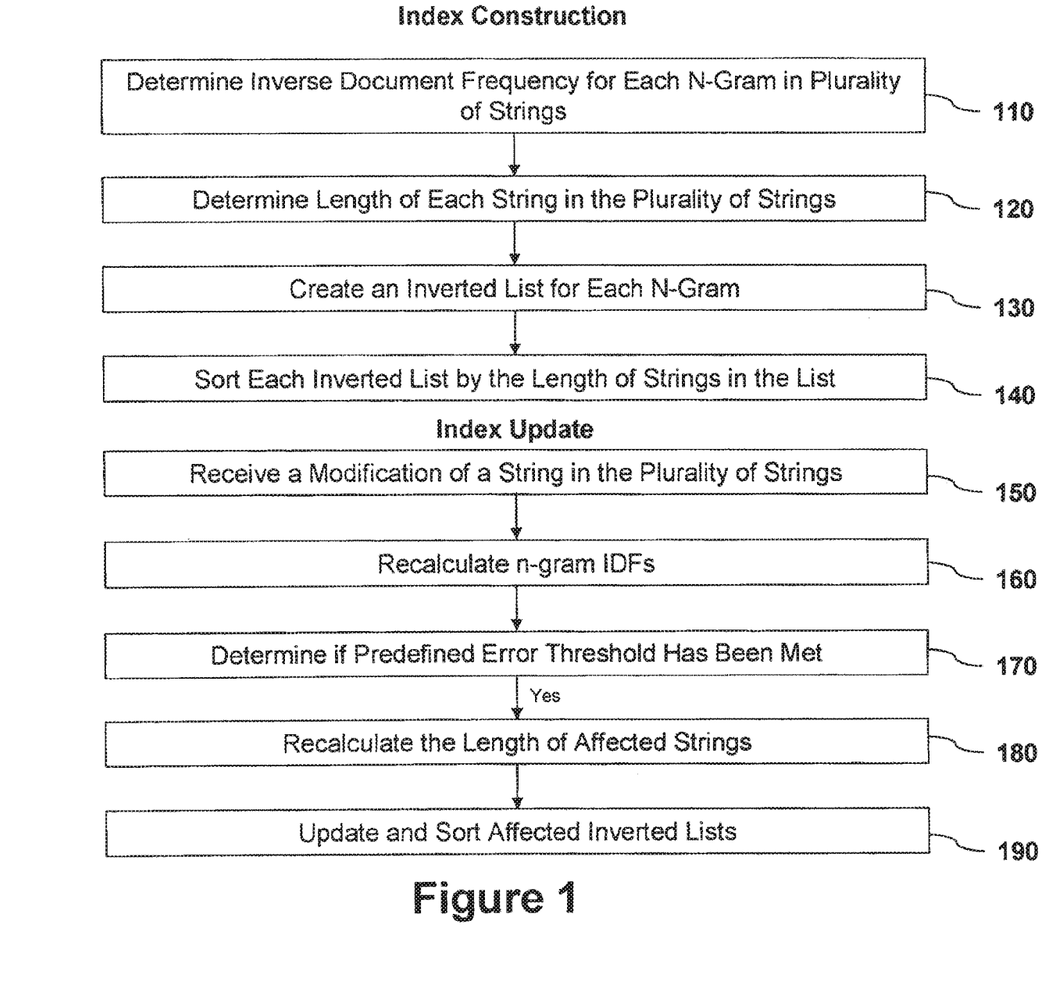
FIG. 1 shows a flow chart of the inverted list creation and updating processes.

FIG. 1 shows a high level flow chart of a method of carrying out embodiments of the disclosed technology. A specialized device, such as a search engine database processing machine (such as a device as is shown in FIG. 4), is used in embodiments of the disclosed technology. Such a device receives database queries and outputs results from the database. In step 110, the IDF for each n-gram in a plurality of strings, such as strings within a database, dataset, or table within a database, is determined as is described above and described in the example shown below with respect to FIGS. 2 and 3. In step 120, the length of each string in the plurality of strings is determined, as described in the example shown below with respect to FIGS. 2 and 3. In step 130, an inverted list for each n-gram is created, where the inverted list for a given n-gram is composed of all strings that contain that n-gram. A list may also contain unique identifiers of strings, instead of the actual strings, for space efficiency (e.g., identifiers can be assigned by way of mapping strings to their actual location in a database file). In step 140, each inverted list is sorted by the length of the strings in the list.

In step 150, a modification, which may be an insertion, a deletion, or a combination thereof, is received for a string within the plurality of strings. While the effects of doing so are discussed in greater detail with respect to FIG. 3, in short, changes to even a single string in the plurality of strings causes a cascading effect of changes that need to be determined. First, the IDF of one or more n-grams determined in step 110 may change as n-grams are added and deleted. Second, the length of the strings determined in step 120 may change. Third, the inverted lists determined in step 130 may change. Fourth, a change in string lengths, due to the changes in n-gram IDFs, might necessitate re-sorting certain inverted lists. Fully propagating such updates is cost prohibitive, and therefore, in the prior art, updates are performed on a weekly or less often basis while error gradually increases within the inverted lists.

Thus, in step 160, the IDFs of affected n-grams are recalculated. In step 170, it is determined if a predefined error threshold has been met. The error threshold is determined with respect to the IDF of each n-gram, and hence the frequency of the n-gram in the plurality of strings. Whenever updates occur, they result in a modification of the n-gram's frequency, and hence its IDF. The error threshold specifies the error we are willing to tolerate between the IDFs that have been used to calculate the lengths of the strings as they currently appear in the inverted lists and the correct IDFs if the string updates were taken into account. The error threshold is more tolerant for n-grams with low IDF (very frequent n-grams) and less tolerant for n-grams with high IDFs (infrequent n-grams). The allowed errors in n-gram IDFs result in outdated string lengths in the n-gram inverted lists. Hence, query answers, using stale string lengths may return both false negative and false positive results. In embodiments of the invention, error thresholds are computed such that no false negatives ever occur and a small number of false positives is allowed (such that incrementally updating the inverted lists becomes cost efficient).

Thus, in step 170, if a predefined error threshold is met, we proceed to steps 180 and 190, and compute the correct lengths of affected strings and resort the appropriate inverted lists.

Before delving into the specifics of the disclosed technology, in order to understand the art, consider a collection of strings D, where every string consists of a number of elements from universe U. For example, let string $s=\{t_1, \ldots, t_n\}$, $t_i \square U$. Let $df(t_i)$. Let $df(t_i)$ be the total number of strings in D containing token $t_i$ and N be the total number of strings. Then:

$$idf(t_i)=\log_2(1+N/df(t_i))$$

Another popular definition of IDF is based on the Okapi BM25 formula:

$$idf(t_i) = \log_2 \frac{N - df(t_i) + 0.5}{df(t_i) + 0.5}$$

The $L_2$ length (as described in the background of the disclosed technology and known in the prior art) of string s is computed as $$L_2(s) = \sqrt{\sum_{t_i \in s} idf(t_i)^2}$$

and one can also compute simpler lengths based on an $L_1$ distance. Define the $L_2$ normalized TF/IDF, BM25 similarity of strings $s_1$ and $s_2$ as:

$$S_2(s_1, s_2) = \sum_{t_i \in s_1 \cap s_2} \frac{idf(t_i)^2}{L_2(s_1)L_2(s_2)}$$

assuming that for short strings the term frequency of the majority of tokens is equal to 1. $L_2$ normalization forces similarity scores in the range [0, 1]. Furthermore, an exact match to the query always has similarity equal to 1 (it is the best match).

Figure 2:
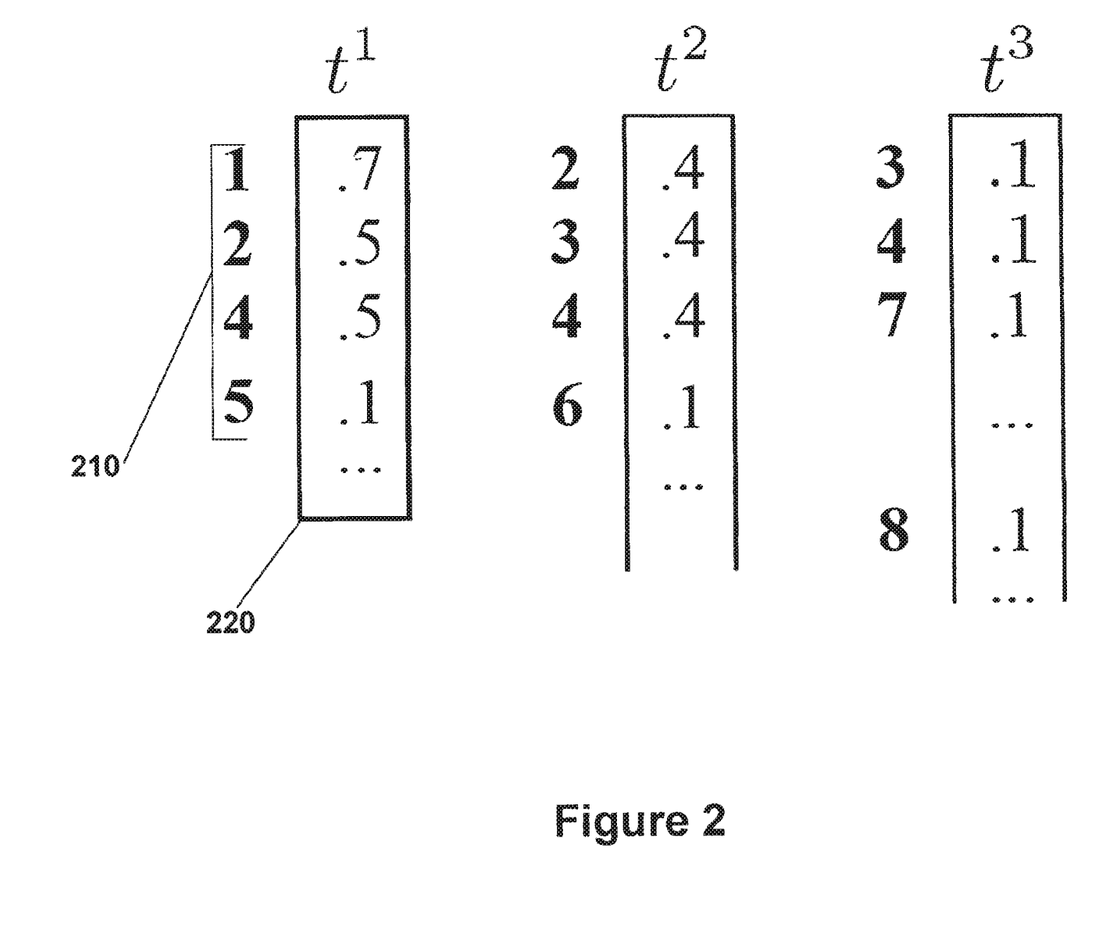
FIG. 2 shows an example of inverted lists corresponding to data strings from a table of a database in embodiments of the invention.

FIG. 2 shows an example of inverted lists corresponding to data strings from a table of a database in embodiments of the invention. An inverted list is a list of every string that contains a specific n-gram as a substring. Strings are associated with unique identifiers 210 in the index (e.g., identifier 1 might correspond to string "Nick Koudas" in the database, while token $t_1$ might correspond to the 3-gram "Kou"). Each string is also associated with a partial weight 220 which is equal to $$w(s,t_i)=idf(t_i)/L_2(s)$$

Thus, for example, string 1 in list $t_1$ is valued at 0.7 using the equation above. By directly scanning the inverted lists corresponding to tokens $t_1$, $t_2$, $t_3$, and so on, in one pass, all the strings that exceed a designated similarity can be determined and reported. Irrelevant strings (i.e., strings whose intersection with the query is empty) are never accessed.

Figure 3:
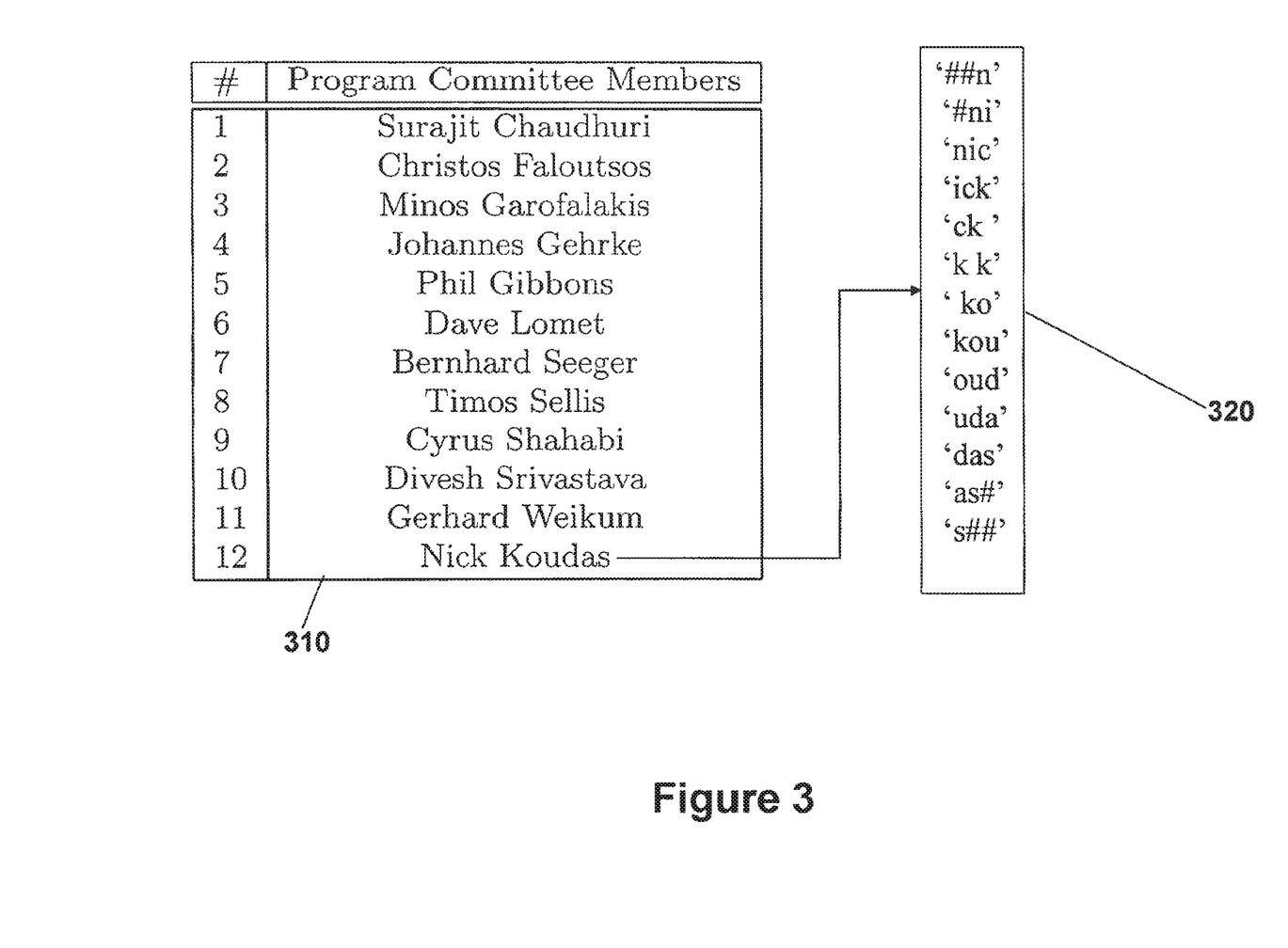
FIG. 3 shows a sample dataset from a database which may be used to carry out embodiments of the invention.
Figure 4:
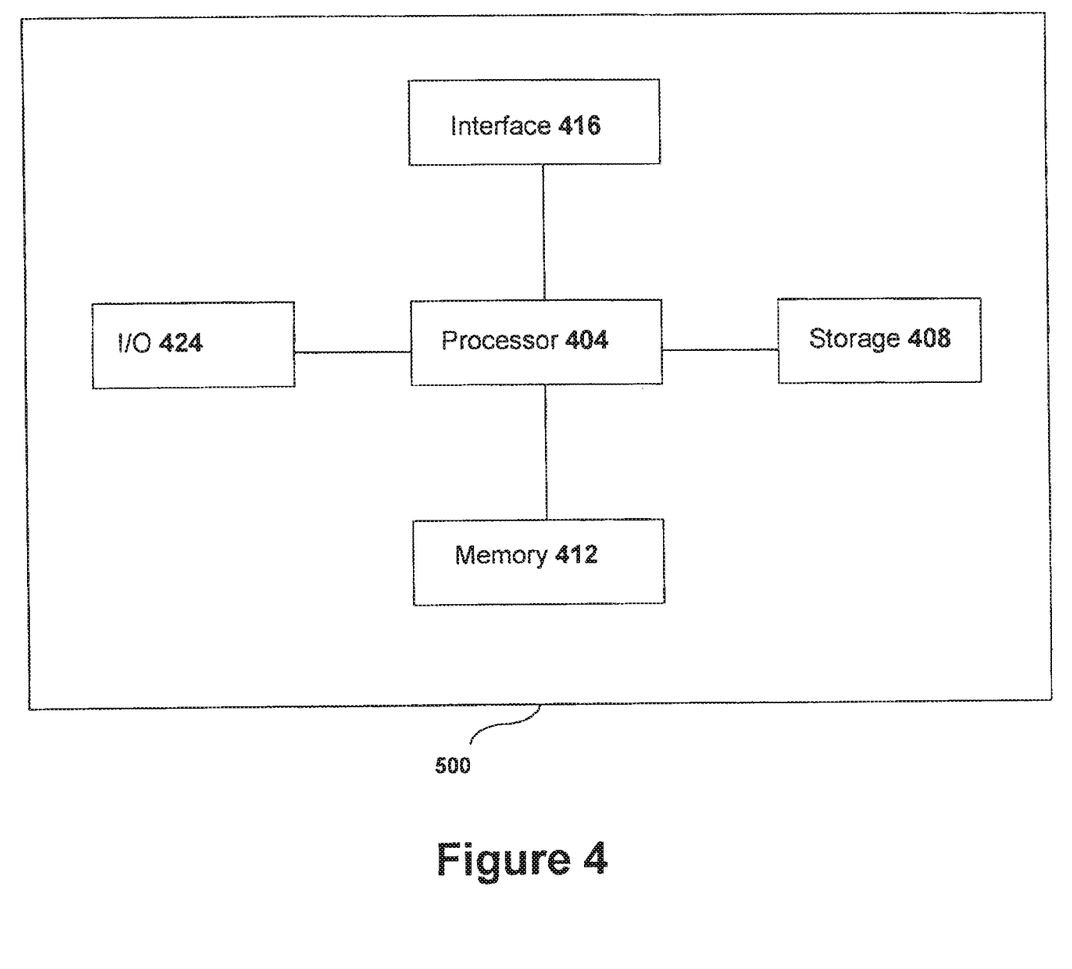
FIG. 4 shows a high-level block diagram of a computer that may be used to carry out the invention.

FIG. 3 shows a sample dataset from a database which may be used to carry out embodiments of the invention. In the following analyses and examples the strings in dataset 310 are decomposed into 3-grams. For example, string 12, "Nick Koudas", is decomposed into 3-grams 320 which are '##n', '#ni', 'nic', 'ick', 'ck', 'k k', 'ko', 'kou', 'oud', 'uda', 'das', 'as#', 's##'. The symbol "#" represents the lack of any character in that space (thus, the string '##n' represents that 'n' is the first character in the string, '#ni' represents that 'ni' are the first two characters in the string, and the reverse is true for the ending n-grams). The dataset 310 shown in FIG. 2 comprises 177 such distinct 3-grams. Only 14 of the 3-grams appear in more than one string. The most frequent 3-gram is 's##', with five appearances.

In embodiments of the invention, consider now that we build the inverted lists corresponding to the 177 3-grams, and that insertions, deletions and modifications arrive at regular time intervals. A single insertion or deletion of a string, changes the total number of strings N in the table, and hence theoretically the weight associated with every single 3-gram, according to the equations listed above. Complete propagation of the update would require recomputation of the length of each string. For example, a modification of a single string, changing "Nick Koudas" to "Nick Arkoudas" would have many consequences. First, this addition changes the length of string 12 (a deletion would also change the length of the string). Second, the addition of 3-grams 'k a', 'ar', 'ark' and 'rko'. Third, the disappearance of 3-grams 'k k', and 'Ko'. A consequence of almost any addition or deletion is that the partial weight of the string has to be updated in all inverted lists corresponding to the prior 3-grams which comprise the modified string.

Finally, consider the modification "Nick Koudas" to "Nick Kouda", deleting 3-grams 'das', 'as#', and 's##'. The by-product of deleting one occurrence of 3-gram 's##', and hence changing the IDF of this 3-gram, is that the lengths of all 5 strings containing this 3-gram change. This in turn means that the 72 lists corresponding to the 3-grams contained in all five strings need to be updated, since they contain partial weights computed using the old length of these strings. Propagating an update that changes the IDF of a very frequent 3-gram, necessitates updating a large fraction of the inverted lists.

An insertion can have one or more of the following consequences: 1. It can generate new tokens, and thus the creation of new inverted lists. 2. It might require adding new strings in existing inverted lists, hence affecting the IDFs of existing tokens. 3. Most importantly, after an insertion the total number of strings N increases by one. As a result the IDF of every single token gets slightly affected, which affects the length of every string and hence all partial weights in the inverted lists. 4. String entries in inverted lists that have no connection to the directly updated tokens might need to be updated. This happens when the length of a string changes due to an updated token, triggering an update to all other lists corresponding to the rest of the tokens contained in that string. 5. The order of strings in a particular inverted list can change. This happens when a different number of tokens between two strings gets updated (e.g., 3 tokens in one string and 1 token only in another), hence affecting the length of one string more than the length of the other. Notice also that identifying the lists containing a particular string whose partial weight needs to be updated is an expensive operation. To accomplish this we need to retrieve the actual string and find the tokens it is composed of. There are two alternatives for retrieving the strings. First, we can store the exact string along with every partial weight in all lists. This solution of course will duplicate each string as many times as the number of tokens it is composed of. The second option is to store unique string identifiers in the lists, and perform random accesses to the database to retrieve the strings. This solution will be very expensive if the total number of strings contained in a modified list is large.

A deletion has the opposite effects of an insertion. A token might disappear if the last string containing the token gets deleted. Various entries might have to be deleted from a number of inverted lists, thus changing the IDFs of existing tokens. The number of strings N will decrease by one. Thus, the IDF of all tokens, and hence, the lengths and partial weights of all strings will slightly change, causing a cascading effect similar to the one described for insertions.

A modification does not change the total number of strings N, and hence does not affect the IDF of tokens not contained in the strings being updated. Nevertheless due to a modification, new tokens can be created and old tokens can disappear. In addition, a modification can change the IDF of existing tokens, with similar cascading effects.

Fully propagating updates is infeasible for large datasets if updates arrive regularly. The alternative is to determine an appropriate error threshold to limit the cascading effect of a given modification, including an insertion or deletion of characters or strings in the dataset. However, it is desirable to ensure that while full updates to the inverted indexes are not taking place, the answers to queries are accurate within a tolerance level. The tolerance level may be such that no false positives or false dismissals of answers appear in answers to queries.

The first way in which the updates may be limited is by relaxing recalculations of N, the total number of strings in a dataset such as in a database. The change of N due to the modification of the total number of strings causes a change in all n-gram IDFs. Let $N_b$ be the total number of strings when the inverted index was built. Then, $N_b$ was used for computing the IDFs of all n-grams. The IDFs will only be updated if the current value of N diverges significantly from $N_b$. Given a query q the loss of precision in evaluating the relaxed similarity $S_{2,b}(q, s)$ is computed using $N_b$ instead of N. Given the log factor in the equations used above, by not updating N when it is within a threshold, the answer to queries will remain within an acceptable tolerance level as will be shown below. Still further, with roughly balanced insertions and deletions, the value of N vs $N_b$ should not change very much in many practical applications.

When a specific n-gram changes, in embodiments of the disclosed technology, an update may be avoided if the computed error is below a threshold. A specific n-gram may change due to an insertion, deletion, or modification of a string in a dataset or database. Remember that a single n-gram IDF modification can have a dire cascading effect on a large number of inverted lists, as discussed above. Assume that the IDF of n-gram $t_i$ has been computed using the document frequency at the time the inverted index was built. In embodiments of the disclosed technology, the current document frequency $df(t_i)$ may vary within some predefined threshold, the calculations of which will be explained below. Again, the effect of a small number of updates to a particular n-gram is insignificant due to the log factor in calculating IDFs. In addition, the cost of propagating changes of frequently updated n-grams is amortized. An important practical consideration here is that the most severe cascading effects during updates are caused by the most frequent n-grams, i.e., the n-grams with large document frequency $df(t_i)$, and hence low inverse document frequency $idf(t_i)$. The most frequent n-grams are obviously the ones that have highly populated inverted lists, and hence the ones causing the biggest changes to the inverted index during updates. These are also the n-grams that are expected to be updated more frequently in many practical applications of the disclosed technology, and thus, the predefined error threshold may differ based on assigning larger error thresholds to the frequent n-grams than the less frequent n-grams. It also follows that the low IDF n-grams (frequent n-grams) contribute the least in similarity scores $S_2(q, s)$, due to the small partial weights associated with them. By delaying the propagation of updates to low IDF n-grams, the cost of updates is significantly reduced, and at the same time, the loss of precision is limited.

Thus, it has been shown that delayed propagation of updates using relaxation in the number of strings N and document frequencies $df(t_i)$ will improve update performance substantially, while at the same time limit the loss of query precision. Next, we determine the exact loss in precision. Let $N_b$, $df_b(t_i)$, $idf_b(t_i)$ be the total number of strings, the document frequencies, and the inverse document frequencies of n-grams in U at the time the inverted index is built. Let N, $df(t_i)$ and $idf(t_i)$ be the current, exact values of the same quantities, after taking into account all updates to the dataset since the inverted index was built. Given a fully updated inverted index and a query q, let the exact similarity score between q and any $s \in D$ be $S_2(q, s)$. Assuming now delayed update propagation, let the approximate similarity score computed using quantities $*_b$ be $\tilde{S}_2(q, s)$. The relation between $S_2$ and $\tilde{S}_2$ can now be quantified to determine the loss in precision as will be shown below.

To introduce notation with an easier exposition we present a loose analysis first. To simplify our analysis assume that the total possible divergence in the IDF of $t_i$, by considering the divergence in both N and $df(t_i)$, is given by:

$$\frac{idf_p(t_i)}{\rho} \leq idf(t_i) \leq \rho \cdot idf_p(t_i)$$

for some value $\rho$. The loss of precision with respect to $\rho$ will now be calculated. The analysis is independent of the particular form of prior equations (referring to the IDF and BM25 similarity measures) and will also hold for all other alternatives of these two measures.

Consider query q and arbitrary string $s \in D$. Their $L_2$ based IDF similarity is equal to:

$$S_2(q, s) = \frac{\sum_{t_i \in q \cap s} idf(t_i)^2}{\sqrt{\sum_{t_i \in s} idf(t_i)^2} \sqrt{\sum_{t_i \in q} idf(t_i)^2}}$$

Let x equal the numerator, the contribution of the n-grams common to both q and s to the score. Let $y = \sum_{t_i \in s \setminus (q \cap s)} idf(t_i)^2$ be the contribution of n-grams in s that do not appear in q, and $z = \sum_{t_i \in q \setminus (q \cap s)} idf(t_i)^2$ the contributions of n-grams in q that do not appear in s.

Define f(x, y, z) as $$S_2 = f(x, y, z) = \frac{x}{\sqrt{x+y}\sqrt{x+z}}$$

The following derivation is based on the fact that the above function is monotone increasing in x, and monotone decreasing in y, z, for positive x, y, z. It is easy to see that the latter holds.

Consider the function $g(x)=1/f(x)^2 \cdot f(x)$ is monotone increasing if and only if $g(x)$ is monotone decreasing.

$$g(x) = \frac{(x+y)(x+z)}{x^2} = 1 + \frac{y+z}{x} + \frac{yz}{x^2}.$$

Since $1/x$ and $1/x^2$ are monotone decreasing, $g(x)$ is monotone decreasing, hence $f(x)$ is monotone increasing. The proof for $f(y)$, $f(z)$ is straightforward.

Given the definition of x, y, z and relaxation factor $\rho$, it holds that:

$$x_b/\rho^2 \leq x_c \leq \rho^2 \cdot x_b$$

$$y_b/\rho \leq y_c \leq \rho \cdot y_b$$

$$z_b/\rho^2 \leq z_c \leq \rho^2 \cdot z_b,$$

where $x_b$, $y_b$, $z_b$ are with respect to IDFs computed at build time, and $x_c$, $y_c$, $z_c$ are the current, exact values of the same quantities.

We are given an inverted index built using IDFs $idf_b(t_i)$, and a query q with threshold $\tau$. We need to retrieve all strings $s \in D: S_2(q, s) \geq \tau$. What if a threshold $\tau' < \tau$ s.t. retrieving all $s \in D: \tilde{S}_2(q, s) \geq \tau'$ guarantees no false dismissals? Notice that for any s, given the proof above, the current score $S_2(q, s)$ can be both larger or smaller than $\tilde{S}_2(q, s)$, depending on which n-grams in x, y, z have been affected. If $\exists s: \tilde{S}_2(q, s) < S_2(q, s)$, we need to introduce threshold $\tau' < \tau$ to avoid false dismissals. Hence:

$$\tau \leq S_2 \leq \frac{\rho^2 x_b}{\sqrt{x_b/\rho^2 + y_b/\rho^2}\sqrt{x_b/\rho^2 + z_b/\rho^2}} = \rho^4 \tilde{S}_2 \Rightarrow \tau' = \tau/\rho^4$$

While this bound is a tolerable threshold in embodiments of the invention, some false positives will be introduced in an answer to a query.

Consider now a more involved analysis that shows that given a relaxation factor $\rho$ the actual loss in precision is a much tighter function of $\rho$. We want to quantify the divergence of $\tilde{S}_2$ from $S_2$, constrained on the inequalities shown above and $S_2(q, s) \geq \tau$, given some query q and similarity threshold $\tau$. The query can be formulated as a constraint optimization problem. Minimize $f(x_b, y_b, z_b)$ constraint upon:

$$f(x_c, y_c, z_c) \geq \tau$$

$$x_c/\rho^2 \leq x_b \leq \rho^2 \cdot x_c$$

$$y_c/\rho \leq y_b \leq \rho \cdot y_c$$

$$z_c/\rho^2 \leq z_b \leq \rho^2 \cdot z_c,$$

where inequalities have been re-written after solving for $x_b$, $y_b$, $z_b$, instead of $x_c$, $y_c$, $z_c$ (the exact same inequalities actually result in this case).

First we show that f(x, y, z) is minimized for y=z. Let $v=(y-z)/2$ and $u=(y+z)/2 \cdot f(x, y, z)$ is minimized, when $g(x, y, z)=f^2(x, y, z)$ is minimized (for positive x, y, z):

$$g(x, y, z) = \frac{x^2}{(x+u)^2 - v^2}.$$

$g(x, y, z)$ is minimized when the denominator is maximized, i.e., when $v^2=0 \Rightarrow y=z$. Now, $f(x_b, y_b, y_b)$ is further minimized when $x_b$ is minimized and $y_b$ (or $z_b$) is maximized, according to our above analysis. Hence, $f(x_b, y_b, z_b)$ is minimized at:

$$f(x_c/\rho^2, \rho^2 y_c, \rho^2 y_c) = \frac{x_c}{x_c + \rho^4 y_c}.$$

Consequently:

$$f(x_c, y_c, z_c) \geq \tau \Rightarrow \frac{x_c}{x_c + y_c} \geq \tau \Rightarrow y_c \leq x_c \frac{1-\tau}{\tau}.$$

Substituting the above equation into the equation proceeding it:

$$f(x_c/\rho^2, \rho^2 y_c, \rho^2 y_c) \geq \frac{x_c}{x_c + x_c \rho^4 \frac{1-\tau}{\tau}} = \frac{\tau}{\tau + \rho^4(1-\tau)}$$

$$\tau' = \frac{\tau}{\tau + \rho^4(1-\tau)},$$

Thus, the final equation satisfies all constraints, guaranteeing no false dismissals and having only few false positives in expectation.

The analysis assumed for simplicity the worst case scenario, where all n-gram IDFs take either their smallest or largest possible value. In practice, of course, the extreme values might not have been reached for all n-grams. Notice that at query evaluation time we know the exact deviation of every n-gram IDF from its correct value. Clearly, we can take this information into account to limit false positives even further.

To further limit false positives, we define the global maximum deviation $\sigma \leq \rho$ among all n-gram IDFs in U. Then, at query time we compute the maximum deviation $\lambda \leq \rho$ among all n-gram IDFs in q. In deriving a lower bound for threshold $\tau$, we use $\lambda$ as a relaxation factor for $x_b$, $z_b$ (the n-grams in $q \cap s$ and $q \setminus (q \cap s)$), and $\sigma$ for $y_b$ (the n-grams in $s \setminus (q \cap s)$). This lower bound in practice will be tighter than our final equation above.

The update propagation algorithm conceptually works as follows. We have an inverted index consisting of one inverted list per token in U, where every list is stored on secondary storage. List entries $\{s, w(s, t_i)\}$ are stored in decreasing order of partial weights w. To support update propagation we will need to perform incremental updates on the sorted lists. Hence, embodiments of this invention may store each list as a B-tree sorted on w. At index construction time we choose slack $\rho$. Assume that we buffer arriving updates and propagate them in batch at regular time intervals (e.g., every 5 minutes). Let the updates be given in a relational table consisting of: 1. The type of update (insertion, deletion, modification); 2. The new data in case of insertions; 3. The old data in case of deletions; 4. Both the old and new data in case of modifications. We also build an IDF table consisting of: 1. A token; 2. The IDF of the token; 3. The current, exact frequency of the token df(t); 4. The frequency of the token at construction time $df_b(t)$. Before applying the batch update to the index, we load the IDF table in main memory. In practice, the total number of tokens |U| for most datasets is fairly small. Hence, maintaining the IDF table in main memory is inexpensive.

Assuming that multiple token IDFs have changed, we need to scan the B-trees corresponding to these tokens, and retrieve all strings contained therein (which requires at least one random I/O per string id for retrieving the actual strings from the database). Then, we compute the new lengths of the strings, given the updated token IDFs. Finally, first we rebuild the B-trees corresponding to tokens whose IDF has changed, and also update all other B-trees that contain those strings. Every time we process a string we store the string id in a hash table and make sure that we do not process that string again, if it is subsequently encountered in another B-tree (this will be the case for strings that contain multiple tokens whose IDFs have changed).

FIG. 4 shows a high-level block diagram of a computer that may be used to carry out the invention. Computer 400 contains a processor 404 that controls the overall operation of the computer by executing computer program instructions which define such operation. The computer program instructions may be stored in a storage device 408 (e.g., magnetic disk, database) and loaded into memory 412 when execution of the computer program instructions is desired. Thus, the computer operation will be defined by computer program instructions stored in memory 412 and/or storage 408, and the computer will be controlled by processor 404 executing the computer program instructions. Computer 400 also includes one or a plurality of input network interfaces for communicating with other devices via a network (e.g., the Internet). Computer 400 also includes one or more output network interfaces 416 for communicating with other devices. Computer 400 also includes input/output 424, representing devices which allow for user interaction with the computer 400 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes. It should also be understood by one skilled in the art that the method, devices, and examples depicted in FIGS. 1 through 3 may be implemented on a device such as is shown in FIG. 4.

The foregoing Detailed Description is to be understood as being in every respect illustrative and exemplary, but not restrictive, and the scope of the technology disclosed herein is not to be determined from the Detailed Description, but rather from the claims as interpreted according to the full breadth permitted by the patent laws. It is to be understood that the embodiments shown and described herein are only illustrative of the principles of the present technology and that various modifications may be implemented by those skilled in the art without departing from the scope and spirit of the technology. Those skilled in the art could implement various other feature combinations without departing from the scope and spirit of the disclosed technology.

The invention claimed is:

1. A method, comprising:
calculating a first inverse document frequency for each of a plurality of n-grams in a plurality of strings;
for each particular n-gram of the plurality of n-grams, creating a sorted list comprising strings, of the plurality of strings, that include the particular n-gram based on the first inverse document frequency for the particular n-gram;
in response to an update to the plurality of strings, determining n-grams, from the plurality of n-grams, affected by the update;
for each respective n-gram determined to be affected by the update:
calculating a second inverse document frequency for the respective n-gram in the updated plurality of strings,
calculating an error for the respective n-gram based on a difference between the first inverse document frequency for the respective n-gram in the plurality of strings and the second inverse document frequency for the respective n-gram in the updated plurality of strings, and
updating the sorted list for the respective n-gram in response to determining that the error for the respective n-gram satisfies a threshold; and
answering a query based on the updated sorted lists.

2. The method of claim 1, wherein updating the sorted list for the respective n-gram comprises:
calculate a length for each string that includes the respective n-gram; and
re-sorting the sorted list for the respective n-gram based on the calculated lengths.

3. The method of claim 1, further comprising:
for each respective n-gram determined to be affected by the update:
determining the threshold for the respective n-gram such that the threshold is inversely correlated with the second inverse document frequency for the respective n-gram.

4. The method of claim 1, wherein creating a sorted list comprising strings, of the plurality of strings, that include the particular n-gram comprises:
identifying strings, of the plurality of strings, that include the particular n-gram; and
sorting the identified strings based on a length of the identified strings.

5. The method of claim 4, further comprising:
calculating the length of the identified strings based on the first inverse document frequency for n-grams identified in the identified strings.

6. The method of claim 1, wherein the update to the plurality of strings comprises an addition of a new string.

7. The method of claim 1, wherein the update to the plurality of strings comprises a deletion of one of the plurality of strings.

8. The method of claim 1, wherein the update to the plurality of strings comprises a modification of one of the plurality of strings.

9. The method of claim 1, further comprising:
receiving the update to the plurality of strings with a batch of updates to the plurality of strings propagated at regular time intervals.

10. A computer readable storage device storing computer program instructions, which, when executed on a processor, cause the processor to perform operations comprising:
calculating a first inverse document frequency for each of a plurality of n-grams in a plurality of strings;

for each particular n-gram of the plurality of n-grams, creating a sorted list comprising strings, of the plurality of strings, that include the particular n-gram based on the first inverse document frequency for the particular n-gram;

in response to an update to the plurality of strings, determining n-grams, from the plurality of n-grams, affected by the update;

for each respective n-gram determined to be affected by the update:

calculating a second inverse document frequency for the respective n-gram in the updated plurality of strings, calculating an error for the respective n-gram based on a difference between the first inverse document frequency for the respective n-gram in the plurality of strings and the second inverse document frequency for the respective n-gram in the updated plurality of strings, and updating the sorted list for the respective n-gram in response to determining that the error for the respective n-gram satisfies a threshold; and answering a query based on the updated sorted lists.

11. The computer readable storage device of claim 10, wherein updating the sorted list for the respective n-gram comprises:

calculate a length for each string that includes the respective n-gram; and re-sorting the sorted list for the respective n-gram based on the calculated lengths.

12. The computer readable storage device of claim 10, the operations further comprising:

for each respective n-gram determined to be affected by the update:

determining the threshold for the respective n-gram such that the threshold is inversely correlated with the second inverse document frequency for the respective n-gram.

13. The computer readable storage device of claim 10, wherein creating a sorted list comprising strings, of the plurality of strings, that include the particular n-gram comprises:

identifying strings, of the plurality of strings, that include the particular n-gram; and sorting the identified strings based on a length of the identified strings.

14. The computer readable storage device of claim 13, the operations further comprising:

calculating the length of the identified strings based on the first inverse document frequency for n-grams identified in the identified strings.

15. An apparatus comprising:

a processor; and a memory to store computer program instructions, the computer program instructions when executed on the processor, cause the processor to perform operations comprising:

calculating a first inverse document frequency for each of a plurality of n-grams in a plurality of strings;

for each particular n-gram of the plurality of n-grams, creating a sorted list comprising strings, of the plurality of strings, that include the particular n-gram based on the first inverse document frequency for the particular n-gram;

in response to an update to the plurality of strings, determining n-grams, from the plurality of n-grams, affected by the update;

for each respective n-gram determined to be affected by the update:

calculating a second inverse document frequency for the respective n-gram in the updated plurality of strings, calculating an error for the respective n-gram based on a difference between the first inverse document frequency for the respective n-gram in the plurality of strings and the second inverse document frequency for the respective n-gram in the updated plurality of strings, and updating the sorted list for the respective n-gram in response to determining that the error for the respective n-gram satisfies a threshold; and answering a query based on the updated sorted lists.

16. The apparatus of claim 15, the operations further comprising:

for each respective n-gram determined to be affected by the update:

determining the threshold for the respective n-gram such that the threshold is inversely correlated with the second inverse document frequency for the respective n-gram.

17. The apparatus of claim 15, wherein the update to the plurality of strings comprises an addition of a new string.

18. The apparatus of claim 15, wherein the update to the plurality of strings comprises a deletion of one of the plurality of strings.

19. The apparatus of claim 15, wherein the update to the plurality of strings comprises a modification of one of the plurality of strings.

20. The apparatus of claim 15, the operations further comprising:

receiving the update to the plurality of strings with a batch of updates to the plurality of strings propagated at regular time intervals.

* * * * *